Figure 1:
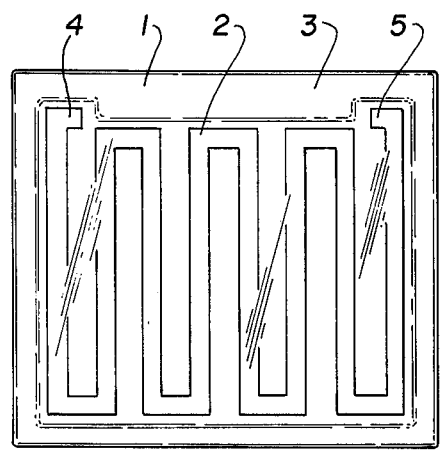

United States Patent [19]

Reichelt et al.

[11] 4,050,052

[45] Sept. 20, 1977

[54] ELECTRICAL TEMPERATURE MEASURING RESISTOR STRUCTURE, PARTICULARLY FOR RESISTANCE THERMOMETERS

[75] Inventors: Walter Reichelt, Hanau; Gunter Sauer, Maintal, both of Germany

[73] Assignee: W. C. Heraeus GmbH, Hanau, Germany

[21] Appl. No.: 695,783

[22] Filed: June 14, 1976

[30] Foreign Application Priority Data

June 21, 1975 Germany .............................. 2527739

[51] Int. Cl.$^2$ ........................ H01C 1/012; H01C 3/04
[52] U.S. Cl. .................................... 338/308; 338/25; 338/28; 338/307; 338/314
[58] Field of Search .................. 338/25, 28, 307, 308, 338/314; 428/209, 210, 411; 427/101, 103, 118; 29/610, 612

[56] References Cited

U.S. PATENT DOCUMENTS

| 2,802,925 | 8/1957 | Von Seelen et al. .................. 338/28 |
| 3,412,043 | 11/1968 | Gilliand ................................. 252/514 |
| 3,781,749 | 12/1973 | Sidney et al. .......................... 338/25 |
| 3,845,443 | 10/1974 | Fisher ..................................... 338/28 |

Primary Examiner—Benjamin R. Padgett
Assistant Examiner—Josephine Lloyd
Attorney, Agent, or Firm—Flynn & Frishauf

[57] ABSTRACT

A substrate carrier of electrically non-conductive material has a strip of resistance platinum applied thereto; in order to avoid the use of an intermediate temperature coefficient of expansion matching layer, the substrate carrier, for example of aluminum oxide, beryllium oxide, or a magnesium silicate, has less than thirty parts per million (ppm) Fe, less than 15 ppm Cr, less than 45 ppm Pb and less than 70 ppm Si in a form capable of reacting with platinum, the sum of the impurities by these metals, if all, or more than one are present, not exceeding 20 ppm; the average thermal coefficient of expansion of the substrate does not deviate from the mean thermal coefficient of expansion of the thermometer grade platinum by more than ± 30%; the platinum layer has a thickness of from 0.1 to 10 μm, and is applied at a temperature in the range of between about 1000° C to 1400° C during 60 minutes in an atmosphere containing oxygen, for example free air.

17 Claims, 2 Drawing Figures

ELECTRICAL TEMPERATURE MEASURING RESISTOR STRUCTURE, PARTICULARLY FOR RESISTANCE THERMOMETERS

The present invention relates to an electrical measuring resistor structure for use in electrical resistance thermometers, and more particularly to such a structure in which resistance-grade platinum is applied to a nonconductive substrate carrier to form a platinum resistance layer or strip. The platinum is applied by vapor deposition, or by dusting or spraying the platinum layer on the substrate.

It has previously been proposed — see U.S. patent application Ser. No. 624,964, filed on Oct. 22, 1975, assigned to the assignee of the present application — to make such a resistance thermometer in which, however, an intermediate layer is provided between the platinum and the substrate. This intermediate layer, applied to the substrate before the platinum is applied, is used in order to provide for as little deviation of the linear temperature coefficient of expansion between the platinum resistance layer and the carrier substrate.

It is an object of the present invention to simplify manufacture of such electrical measuring resistors without detracting from the advantageous characteristics of such resistors; and to provide a resistor having the desirable characteristics of the resistor disclosed in the aforementioned application which is, however, easier to manufacture.

Subject matter of the present invention: Surprisingly, it has been found that the intermediate layer used in the resistor disclosed in the aforementioned application is not necessary if, in accordance with the present invention, the carrier substrate has less than 30 parts per million (ppm) Fe, less than 15 ppm Cr, less than 45 ppm Pb and less than 70 ppm Si in a form capable of reacting with platinum, and that, if more than one such metal is present, the sum of the contamination by these metals does not exceed 20 ppm. The mean or average thermal coefficient of expansion of the substrate will deviate from the mean thermal coefficient of expansion of the thermometer grade platinum by less than $\pm$ 30%. The platinum layer has a thickness of between 0.1 to 10 $\mu$m. The substrate, coated with the platinum, is heated in an atmosphere containing oxygen for a period of time of at least 60 minutes to a temperature of between about 1000° C to 1400° C.

Thermometer grade platinum, as used in the present specification, is the type of platinum which meets the basic requirements for this use, for example as specified in industrial specification DIN No. 43,760 of Sept. 1968.

The mean or average thermal coefficient of expansion, as used herein, is the average value which is obtained in a temperature range between 0° and 800° C, which is the temperature range of measurement of interest for thermometer units of this type.

The measuring resistors satisfy all requirements placed thereon with respect to thermal, electrical and mechanical characteristics. The platinum resistance layer is pure and free from defects. The thermometer structure can be easily made, using little material and not requiring any complicated steps of manufacturing technology.

Figure 2:
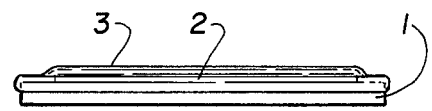

The invention will be described by way of example with reference to the accompanying drawings, wherein:

FIG. 1 is a schematic top view of the resistor, with the cover layer removed (or transparent); and FIG. 2 is a side view of the resistor structure.

A substrate 1, for example of aluminum oxide, beryllium oxide, thorium oxide, magnesium oxide, or magnesium silicate is provided. A platinum strip 2 is applied to the substrate; the platinum strip 2 is applied in undulating form, or in any other suitable and desired pattern. The top view of FIG. 1 illustrates a suitable arrangement. The ends of the resistance strip 2 have electrodes 4, 5 applied thereto which, in a preferred form, extend over a narrow side of the substrate 1 and which can be applied in accordance with the same process as the resistance strip 2. They may be of the same material as the resistance strip 2. A particularly suitable and preferred process is the application of the resistance strip by vapor deposition and especially vapor deposition by means of electron beam irradiation; this process causes the least contamination.

The platinum strip 2, applied in a predetermined pattern, should preferably have a thickness of between 1 and 5 $\mu$m, although the range of thickness can be much wider.

The substrate 1 is heated in air before the platinum layer is applied thereto. During application of the platinum strip it is heated to a temperature in the range of between 500° 900° C. Thereafter, the coated substrate 1, to which the strip 2 has now been applied, is heat-treated in a furnace at a temperature of about between 1000° and 1400° C for a period of time of at least 60 minutes.

A cover layer capable of withstanding high temperatures can be applied. This cover layer, shown in FIG. 2 schematically at 3, may consist for example of an epoxy resin, glass, or metal oxides of the group of aluminum, beryllium, thorium, rare earths, or the like. The cover layer 3 may be applied by vapor deposition, dusting, or spraying; its primary characteristics should be to be resistant against thermal and mechanical effects. The cover layer should additionally, preferably, provide protection against diffusion of materials with which the measuring resistor comes into contact, that is, ambient surrounding materials which might diffuse from the gaseous phase, or liquids or solids with which the resistor is being contacted. The covering layer should also provide mechanical protection to the resistor structure with respect to articles with which the resistor might come into contact.

Various changes and modifications may be made within the scope of the inventive concept; for example, different methods of metal deposition may be used, if they meet the requirements of purity of the layer or strip being applied to the substrate, and are capable of applying the strip in the predetermined resistance pattern, a preferred form of which is shown in FIG. 1.

The influence of the impurities on the platinum regarding the temperature coefficient of resistance of the different materials differs. One weight ppm of the collowing metals reduces the TCR (Temperature Coefficient of Resistance) of platinum in the following manner:

1. Cr 3.25 . $10^{-6}$/° C
2. Fe 1.28 . $10^{-6}$/° C
3. Pb 0.90 . $10^{-6}$/°C
4. Si 0.55 . $10^{-6}$/° C

The influence of the various impurities is effective on the platinum only partially; it depends, to some extent, on the process of preparing the platinum layer, that is, whether by vapor deposition or by sputtering; it has been estimated that, when preparing the platinum in accordance with the disclosed method, the influence of the impurities is effective by only about 50%. The platinum used, of course, is the thermometer platinum, that is, a platinum of extremely high purity, as set forth in industry specification DIN 43 760.

We claim:

1. Electrical measuring resistor structure for use in resistance thermometers having a carrier (1) of electrically non-conductive material and a strip of platinum resistance layer (2) applied to the carrier in a predetermined pattern, and comprising the improvement wherein the carrier comprises a substrate (1) which includes less than 30 parts per million (ppm) Fe, less than 15 ppm Cr, less than 45 ppm Pb and less than 70 ppm Si in a form which can react with the platinum and wherein the sum of said named materials, if more than one is present, does not exceed 20 ppm;

the platinum layer has a thickness of between 0.1 and 10 μm;

and the mean thermal coefficient of expansion of the substrate differs from the coefficient of expansion of the thermal platinum by less than about ± 30%.

2. Structure according to claim 1, wherein the substrate comprises at least one of: aluminum oxide, beryllium oxide, thorium oxide, magnesium oxide, a magnesium silicate.

3. Structure according to claim 1, further comprising a cover layer (3) for protection of the strip of platinum (2) and the substrate, said cover being high temperature and mechanical wear resistant.

4. Structure according to claim 3, wherein the cover layer (3) comprises metal oxides of at least one: aluminum, beryllium, thorium, rare earths.

5. Structure according to claim 1, wherein the substrate comprises aluminum oxide.

6. Structure according to claim 1, wherein the platinum layer has a thickness of between 1 to 5 μ m.

7. Structure according to claim 1, wherein the substrate (1) with the strip of platinum (2) applied, is heated in an oxygen-containing atmosphere to a temperature in the range of between about 1000° to 1400° C for a period of at least 60 minutes.

8. Structure according to claim 1, wherein the substrate (1) during application of the strip (2) of platinum is at a temperature in the range of about between 500° to 900° C.

9. Structure according to claim 1, wherein the substrate (1) before application of the strip (2) of platinum is heat-treated in air.

10. Structure according to claim 1, wherein the substrate (1) with the strip (2) of platinum applied thereto is heated in air to a temperature of between about 1050° to about 1150° C for a period of about 3 hours.

11. Structure according to claim 2, further comprising a metal oxide cover layer (3) including at least one of: aluminum oxide, beryllium oxide, thorium oxide, an oxide of a rare earth; the platinum strip (2) has a thickness of between 1 to 5 μm, and the substrate (1) with the strip of platinum (2) applied thereto is heated in air to a temperature of between about 1050° to 1150° C for a period of about 3 hours.

12. Structure according to claim 11, wherein the substrate comprises aluminum oxide.

13. Method to make a resistor structure, particularly for resistance thermometers having a substrate (1) which includes less than 30 parts per million (ppm) Fe, less than 15 ppm Cr, less than 45 ppm Pb and less than 70 ppm Si in a form which can react with the platinum and wherein the sum of said named materials, if more than one is present, does not exceed 20 ppm;

the platinum layer has a thickness of between 0.1 and 10 μm;

and the mean thermal coefficient of expansion of the substrate differs from the coefficient of expansion of the thermal platinum by less than about ±30%;

and wherein the substrate (1) with the strip of platinum (2) applied thereto is heated to a temperature in the range of about 1000° to 1400° C in an atmosphere containing oxygen for about 1 hour.

14. Method according to claim 13, wherein the substrate, during deposition of the strip of platinum (2) has a temperature in the range of about 500° to 900° C.

15. Method according to claim 14, wherein the strip of platinum is applied by vapor deposition by means of electron beam heating.

16. Method according to claim 13, further comprising the step of heat-treating the substrate (1) before application of the strip of platinum (2) thereto in air.

17. Method according to claim 15, wherein the platinum strip (2) has a thickness of between 1 to 5 μ and the substrate (1) with the strip of platinum applied thereto is heated in air to a temperature of between about 1050° to 1150° C for a period of time of about 3 hours.

* * * * *